Oct. 10, 1961    N. C. DE RIJCKE    3,003,463
HATCHING DRAWERS
Filed Sept. 18, 1958
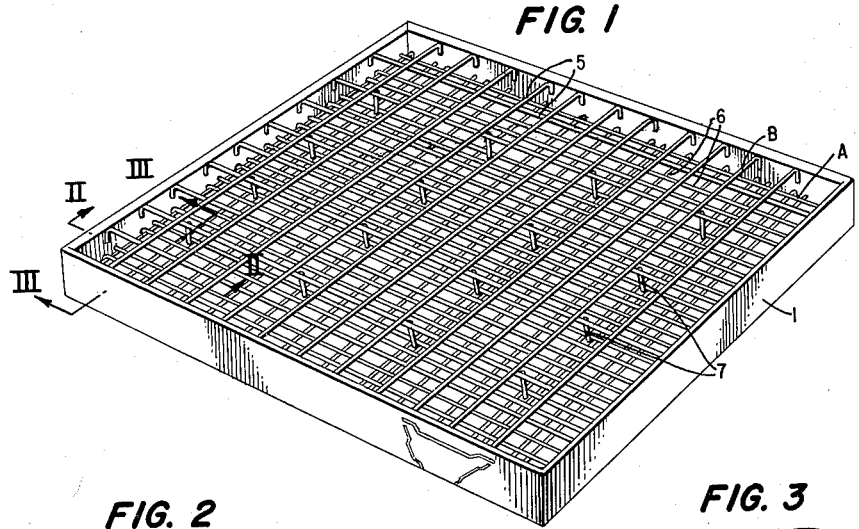
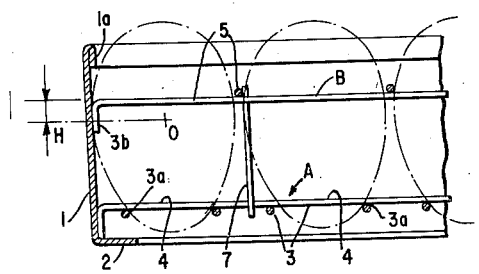
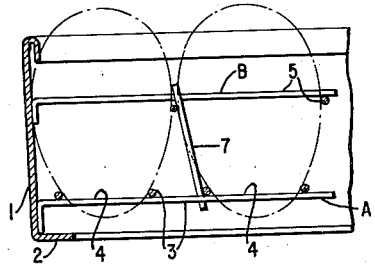
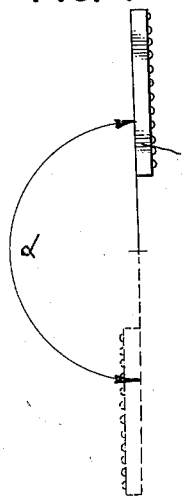
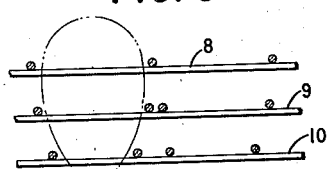
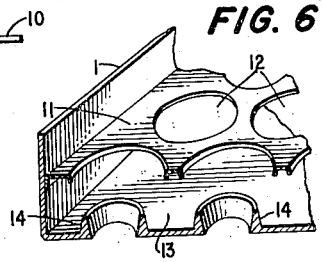
INVENTOR
NORBERT CYRIEL DE RIJCKE
BY Nathan N. Kraus
Frank H. Marks
ATTORNEYS

United States Patent Office 3,003,463
Patented Oct. 10, 1961

3,003,463
HATCHING DRAWERS
Norbert Cyriel De Rijcke, Stationstraat, 59,
Gavere (O.-Vl.), Belgium
Filed Sept. 18, 1958, Ser. No. 761,896
Claims priority, application Belgium Jan. 15, 1958
4 Claims. (Cl. 119—43)

This invention concerns marked improvements to hatching drawers, by which it becomes possible to place, take out, examine and count the eggs in the drawer much faster, as well as to turn or tilt the complete drawer with the eggs over a considerably larger angle than has been possible up till now.

It is a well known fact, that the drawers or trays in current use consist of a bottom, which may or may not be perforated, surrounded by a vertical side wall of sufficient height. In these sorts of draws, the eggs are placed on end next to each other and, in order to allow the turning or tilting over of the drawers, one is obliged to fill up the ends of the partially or wholly occupied drawers with paper or other adequate spacers. In this manner it is not possible to turn or tilt the drawers by a large angle, without the eggs dropping out. It is however a fact, that by turning or tilting the eggs considerably, a better and more complete absorption of the foodstuffs contained therein is obtained, which makes it possible to produce more and better chicks. Moreover, the viability of the chicks is thereby greatly increased.

It is quite clear from the above description, that such a type of drawer does not permit the eggs to be placed a quick in or withdrawn rapidly from the drawer. A quick count or check of the eggs is also not possible with this arrangement.

The drawer according to the invention systematically eliminates all these and many other inconveniences.

The drawer according to the invention offers the particular characteristic that it is subdivided and conditioned in such a way, that eggs placed into it are separated from each other and are consequently more easily subjected to air flow. As a consequence hereof, the eggs can be placed and removed much faster, and the prevailing heat, humidity and oxygen concentration is much better distributed. By means of this special conditioning it also becomes possible to count the eggs more quickly whatever their bulk.

Another particular characteristic of the drawers according to the invention is found in the fact that they are conditioned in such a manner that the eggs are sufficiently supported above their center of gravity, that it becomes possible to turn or tilt the drawer by a maximum total angle of 180°.

Preferably, use is made of a frame fitted with elements at least at two different levels therein, the upper element being provided with openings through which eggs can be introduced individually so that their center of gravity comes below the top surface of aforementioned top element; the lower element being provided with openings which are smaller than those of the top element, or with cup shaped parts in which the lower tip of the eggs may rest.

Next will be given a more detailed description of a few possible forms of construction of drawers according to the invention, without however limiting the scope of the latter to these particular forms. The description is illustrated by the appended drawings of which:

FIGURE 1 is a perspective view of a possible form of construction for a drawer according to the invention;

FIGURE 2 is a cross sectional view on an enlarged scale taken on line II—II of FIGURE 1;

FIGURE 3 is a cross sectional view on an enlarged scale taken on line III—III of FIGURE 1;

FIGURE 4 is a side view on a reduced scale of a drawer according to the invention in its two extreme positions of turning or tilting;

FIGURE 5 is a partial sectional view of another form of construction of a drawer according to the invention;

FIGURE 6 illustrates partially in cross section and partially in perspective view, a third possible form of construction of a drawer according to the invention.

Preferably, a drawer according to the invention consists of a frame 1, provided at its lower edge with a inwardly bent flange 2 at 90° to it, the top edge 1a being bent right over in order to avoid any cutting edges. In this case, the bottom of the drawer consists of a grid A formed by a number of fairly closely spaced parallel twin wires 3, running lengthwise and crosswise respectively and preferably soldered together at the cross-points as at 3a. The ends 3b of most of these wires are bent over at 90° and soldered to the inner walls of frame 1. In this manner a network or grid is obtained of which the lower meshes 4 act as support for the lower tip of the eggs. This network should preferably be placed at such a height from the lower edge of frame 1, that the lower tip of the eggs can not protrude below aforesaid edge. A second net-work or grid B is provided and fitted above the previously described one, it being fixed to the inner wall of frame 1 in the same manner as the lower network. This upper network, however, consists of equally spaced single lengthwise and crosswise wires 5 preferably soldered together at the cross-points. The thus formed meshes 6 of this network are of such dimensions as to allow the passage of one egg each. This network is fitted at such a height in the drawer, that the centers of gravity O of the eggs are always located under this network, preferably at a distance H thereof. It is moreover preferable, in order to increase the rigidity of the assembly, to join up both networks by means of more or less vertical rods 7.

From FIGURE 4 it can be seen, that a drawer designed according to the invention can be turned through an angle corresponding to a maximum of 180°, which has hitherto been impossible with the traditional drawers.

It is quite obvious that drawers constructed according to the invention may appear in all sorts of forms differing from the one described above, as long as they remain within the scope of the invention, and that they may be manufactured to all sorts of different dimensions and out of various other materials.

For instance, a drawer according to the invention might be fitted with three networks or grids 8–9–10, as represented in FIGURE 5. The size of the meshes of these various networks should in this case, for example, become smaller towards the bottom.

In FIGURE 6 it can be seen that it could for instance also be possible to replace the top network by an element 11, made for example of plastic material, provided with openings 12. The lower element or bottom of the drawer 13 could in this case for instance be provided with tubular bosses 14, wherein the tips of the eggs could rest.

What I claim is:

1. A hatching drawer comprising an egg tray capable of being tilted from a vertical plane through substantially 180° comprising a perimetric frame, at least two vertically spaced parallel grids having substantially square meshes, each grid being formed of a first set of parallel rods having relatively small cross-sectional areas and supported on opposite sides of said frame, and a second set of similar parallel rods secured to and crossing the rods of said first set at right angles thereto, all of the rods of one set being coplanar, the spacings between the rods of any one grid being larger than the spacings of corresponding rods of a lower disposed grid whereby the dimensions of the meshes of any one grid are larger than the dimensions of the meshes of a lower disposed grid, the centers of corresponding meshes of said vertically spaced grids being in substantial vertical alignment and the uppermost grid being vertically spaced a substantial distance from the lowermost grid to dispose the centers of gravity of the eggs to be handled below said uppermost grid when the same are nested in the lowermost grid to retain the eggs within said tray during said tilting movement.

2. The invention as defined in claim 1 in which all of the rods forming the different grids have substantially the same cross-sectional area.

3. The invention as defined in claim 1 in which the grids are stiffened by a plurality of rigid upright elements, each upright being secured at its upper end to one grid and at its lower end to a lower disposed grid.

4. The invention as defined in claim 1 in which the grids are formed of iron wires with the wires of one set integrally connected to the wires of the other set at their crossing points.

References Cited in the file of this patent

UNITED STATES PATENTS

| | | |
|---|---|---|
| 1,369,323 | Clairemont | Feb. 22, 1921 |
| 2,407,079 | Howard | Sept. 3, 1946 |
| 2,500,396 | Barker | Mar. 14, 1950 |